(12) United States Patent
Ge et al.

(10) Patent No.: US 10,902,093 B2
(45) Date of Patent: Jan. 26, 2021

(54) DIGITAL RIGHTS MANAGEMENT FOR ANONYMOUS DIGITAL CONTENT SHARING

(71) Applicant: KONINKLIJKE PHILIPS N.V., Eindhoven (NL)

(72) Inventors: Xin Ge, Shanghai (CN); Fubiao Xia, Shanghia (CN); Jin Qu, Shanghai (CN)

(73) Assignee: Koninklijke Philips N.V., Eindhoven (NL)

( * ) Notice: Subject to any disclaimer, the term of this patent is extended or adjusted under 35 U.S.C. 154(b) by 245 days.

(21) Appl. No.: 16/099,058

(22) PCT Filed: Mar. 20, 2017

(86) PCT No.: PCT/EP2017/056471
§ 371 (c)(1),
(2) Date: Nov. 5, 2018

(87) PCT Pub. No.: WO2017/194231
PCT Pub. Date: Nov. 16, 2017

(65) Prior Publication Data
US 2019/0147142 A1    May 16, 2019

(30) Foreign Application Priority Data

Dec. 5, 2016   (EP) .................................... 16202235

(51) Int. Cl.
*G06F 21/10* (2013.01)
*G06F 21/62* (2013.01)
*H04L 9/32* (2006.01)

(52) U.S. Cl.
CPC .......... *G06F 21/10* (2013.01); *G06F 21/6254* (2013.01); *H04L 9/3263* (2013.01);
(Continued)

(58) Field of Classification Search
CPC ................. G06F 21/10; G06F 21/6254; G06F 2221/0791; H04L 9/3271; H04L 9/3263; H04L 2209/42; H04L 2209/603
See application file for complete search history.

(56) References Cited

U.S. PATENT DOCUMENTS 8,762,741 B2    6/2014  Chase et al.
8,887,299 B2 *  11/2014 Wang ...................... G06F 21/10
                                                    726/27
(Continued)

FOREIGN PATENT DOCUMENTS

WO   2007047846 A2   4/2007
WO   2007086015 A2   8/2007
WO   2009031082 A1   3/2009

*Primary Examiner* — Cheng-Feng Huang

(57) ABSTRACT

Embodiments of the present disclosure relate to digital rights management. A method for managing rights transfer of using digital content from a first device (120) to a second device (130) is proposed, comprising generating at an authentication device (110) a first authentication dataset C by encrypting a first verification code R1 using at least one public key for at least one device blacklisted by the authentication device (110). The first authentication dataset C and a second verification code R2 are provided from the authentication device 110 to the first device (120) and a response message M is returned from the second device (130) to the authentication device (110). The method also comprises verifying validity of the second device (130) at the authentication device (110) based on the received response message M. In accordance with embodiments of the present disclosure, the DRM protected digital content can be shared with high security, while the recipient is kept anonymous to the DRM server.

13 Claims, 3 Drawing Sheets

(52) U.S. Cl.
CPC .... *H04L 9/3271* (2013.01); *G06F 2221/0791* (2013.01); *H04L 2209/42* (2013.01); *H04L 2209/603* (2013.01)

(56) References Cited

U.S. PATENT DOCUMENTS

| | | | | |
|---|---|---|---|---|
| 2006/0010500 A1* | 1/2006 | Elazar | | H04L 63/0853 726/27 |
| 2006/0047957 A1* | 3/2006 | Helms | | H04N 21/6582 713/165 |
| 2006/0080535 A1* | 4/2006 | Elazar | | G06F 21/10 713/176 |
| 2007/0219917 A1* | 9/2007 | Liu | | G06Q 10/10 705/59 |
| 2008/0152146 A1* | 6/2008 | Conrado | | G06F 21/10 380/278 |
| 2008/0184350 A1* | 7/2008 | Chu | | H04N 21/43615 726/7 |
| 2008/0209575 A1* | 8/2008 | Conrado | | G06F 21/6254 726/29 |
| 2008/0229387 A1* | 9/2008 | Baks | | H04L 67/42 726/1 |
| 2008/0235810 A1* | 9/2008 | Staring | | G06F 21/10 726/29 |
| 2009/0049556 A1* | 2/2009 | Vrielink | | G06F 21/10 726/26 |
| 2009/0077667 A1* | 3/2009 | Van Rijnsoever | | G06F 21/10 726/26 |
| 2009/0106847 A1* | 4/2009 | Krupman | | G06F 21/10 726/26 |
| 2009/0265556 A1* | 10/2009 | Lee | | H04L 63/10 713/169 |
| 2010/0217985 A1* | 8/2010 | Fahrny | | G06F 21/10 713/169 |
| 2010/0268936 A1* | 10/2010 | Matsushima | | H04L 9/0836 713/153 |
| 2011/0225417 A1* | 9/2011 | Maharajh | | H04L 65/4076 713/150 |
| 2012/0291142 A1* | 11/2012 | Seleznev | | G06F 16/00 726/30 |
| 2013/0173912 A1 | 7/2013 | Cui et al. | | |
| 2013/0239229 A1* | 9/2013 | Xi | | G06F 21/6218 726/27 |
| 2013/0276148 A1* | 10/2013 | Killian | | G06F 21/10 726/30 |
| 2014/0298488 A1* | 10/2014 | Barber | | G06F 21/6218 726/28 |
| 2015/0156201 A1* | 6/2015 | New | | G06F 21/10 726/31 |
| 2015/0304736 A1 | 10/2015 | Lal et al. | | |

* cited by examiner

US 10,902,093 B2

DIGITAL RIGHTS MANAGEMENT FOR ANONYMOUS DIGITAL CONTENT SHARING

CROSS-REFERENCE TO PRIOR APPLICATIONS

This application is the U.S. National Phase application under 35 U.S.C. § 371 of International Application No. PCT/EP2017/056471, filed on Mar. 20, 2017, which claims the benefit of Chinese Patent Application No. PCT/CN2016/081837, filed on May 12, 2016 and European Patent Application No. 16202235.4, filed on Dec. 5, 2016. These applications are hereby incorporated by reference herein.

FIELD OF THE INVENTION

Embodiments of the present disclosure generally relate to digital rights management (DRM), and more particularly, to a method, devices, a system, and a computer program product for managing rights transfer of using digital content, such as to improve security and anonymity of sharing digital content in DRM systems.

BACKGROUND OF THE INVENTION

In past decades, there has been an increasing demand for organizing and distributing digital contents like electronic books, magazines, discs of music, movies, and so forth. DRM is widely used to protect the digital contents. DRM refers to the technology that inhibits any use of digital contents that are not desired or permitted by the content provider or distributor. That is, DRM is used to ensure that only the authorized users can access the protected contents based on the predefined rules.

Traditionally, DRM is used for protecting copyright of digital contents through cryptographic methods. In a DRM system, a DRM server manages a plurality of DRM devices, and each of the DRM devices is associated with a public and private key pair corresponding to the unique identity of that DRM device. Digital content such as an electronic book, music and movie is encrypted, and the key for decryption is distributed within a license. Only a subscriber or a user device that has a valid license can decrypt and consume the content. Usually the license is specific to the subscriber or the user device, and is managed by a DRM server, such that the digital content and/or the license are infeasible to redistribute.

After an item of digital content is obtained by a subscriber, the subscriber may possibly want to transfer his/her rights of using the digital content to another one, for example by reselling or gifting the digital content to someone else whom the subscriber knows. When an authorized subscriber wants to share digital content to a recipient, the subscriber who owns a license may provide the recipient with a token which can be used to acquire a new license from the DRM server. The initial license will then be revoked or invalidated, and the recipient may use the new license to consume the digital content. In such a case, for avoiding from faking or cheating, the DRM server usually needs to verify if the identity of the recipient device is still valid or if the recipient is a blacklisted forger before granting a new license. However, as the digital content sharing is much of a private behavior, it is likely that both parties don't want to reveal the identity of the recipient to the DRM server. Methods have been proposed to reserve privacy of digital content sharing, for example, the device of the recipient can be assigned with an anonymous tag or a watermark to protect its privacy, but it is not yet satisfactory enough to balance between security and anonymity. So there is a realistic need to limit the exchange of private information only between the sender and the recipient.

SUMMARY OF THE DISCLOSURE

Embodiments of the present disclosure propose a method, devices, a system and a computer program product for digital rights management.

In a first aspect, embodiments of the present disclosure provide a method for managing rights transfer of using digital content from a first device to a second device, comprising a step of providing a first verification code $R_1$ and a second verification code $R_2$. In embodiments of this disclosure, at least one of the first verification code $R_1$ and the second verification code $R_2$ includes a random number, and a length of at least one of the first verification code $R_1$ and the second verification code $R_2$ exceeds a predetermined length. The method also comprises a step of encrypting the first verification code $R_1$ at the authentication device with one or more public keys that are not in use as valid public keys, such as to generate a first authentication dataset C including one or more encrypted versions of the first verification code $R_1$.

The method further comprises steps of encrypting the second verification code $R_2$ at the first device with a public key of the second device, and combining such encrypted version of the second verification code $R_2$ and the elements in the authentication dataset C, such as to generate a second authentication dataset C'.

The method further comprises a step of obtaining a response message M at the second device by decrypting, with a private key of the second device, the elements in the second authentication dataset C'. Then the response message M is sent from the second device to the authentication device. In an optional embodiment of the present disclosure, said response message M is first transmitted from the second device to the first device, and then forwarded from the first device to the authentication device, so as to further protect the privacy of the second device.

The method further comprises a step of verifying the response message M at the authentication device to allow the rights transfer only when the response message M contains a data value corresponding to the second verification code $R_2$ but does not contain any data value corresponding to the first verification code $R_1$, or otherwise to deny the rights transfer if the verification fails.

According to an optional embodiment of the present disclosure, the second device sends its device certificate to the first device, the first device verifies whether the device certificate of the second device is valid or not, and provides the authentication device with an indication V. The authentication device checks the indication V, and carries out the step of verifying the response message M only when the indication V suggests that the device certificate of the second device is valid.

In an optional embodiment of the present disclosure, the aforementioned method is initiated by the first device, for example by sending a sharing request to the authentication device, together with an ID of the digital content to be shared with the second device.

In an optional embodiment of the present disclosure, when the authentication device determines to allow the rights transfer, it will generate a new license of using the digital content, for example on basis of an old license owned by the first device and/or the ID of the digital content to be shared, by using an encryption key obtained from the second device. Then the authentication device can send the new license to the first device to enable the content sharing. Then the old license owned by the first device can be revoked or invalidated.

For further protecting the identity of the second device from being revealed, according to an optional embodiment of the present disclosure, the step of obtaining the response message M at the second device further comprises a step of imposing a one-way function H( ), for example a hash function, on the decrypted elements of the second authentication dataset C'; and the step of verifying at the authentication device further comprising a step of imposing the same one-way function H( ) on the first verification code $R_1$ and the second verification code $R_2$ to obtain a modified first verification code $H(R_1)$ and a modified second verification code $H(R_2)$, respectively. The rights transfer is allowed only when the response message M contains a data value corresponding to the modified second verification code $H(R_2)$ but does not contain any data value corresponding to the modified first verification code $H(R_1)$.

In a second aspect, embodiments of the present disclosure provide an authentication device. The authentication device comprises a processing unit and a memory coupled to the processing unit and storing instructions thereon. The instructions, when executed by the processing unit, cause the authentication device to perform acts including the step of: generating a first authentication dataset C of encrypted verification codes by encrypting a first verification code $R_1$ with one or more public keys that are not in use as valid public keys; sending the first authentication dataset C from the authentication device to a first device; receiving a response message M from a second device, where the response message M having been generated by decrypting a second authentication dataset C' with a private key of the second device, and which second authentication dataset C' having been generated by combining the elements in the authentication dataset C and an encrypted version of a second verification code $R_2$ encrypted with a public key of the second device; and comparing the response message M with the elements in the first authentication dataset C and the second verification code $R_2$, and allowing the rights transfer only when the response message M contains a data value corresponding to the second verification code $R_2$ but does not contain any data value corresponding to the first verification code $R_1$, or otherwise to deny the rights transfer if the verification fails.

In a third aspect, embodiments of the present disclosure provide a device capable of transferring rights of using digital content to a second device under management of an authentication device. The device comprises a processing unit and a memory coupled to the processing unit and storing instructions thereon, and the instructions, when executed by the processing unit, cause the device to perform acts including the steps of: receiving a first authentication dataset C composed of encrypted versions of a first verification code $R_1$ from the authentication device, where the encrypted versions of the first verification code $R_1$ having been generated by encrypting the first verification code $R_1$ with one or more public keys that are not in use as valid public keys; encrypting a second verification code $R_2$ with a public key of the second device; combining such encrypted version of the second verification code $R_2$ and the encrypted versions of the first authentication dataset C, such as to generate a second authentication dataset C', and sending the second authentication dataset C' to the second device; receiving a response message M from the second device and forwarding the same to the authentication device for verification, where the response message M having been generated by decrypting the second authentication dataset C' with a private key of the second device; and receiving a new license of using the digital content from the authentication device after the rights transfer is allowed by the authentication device.

In a fourth aspect, embodiments of the present disclosure provide a system comprises an authentication device, a first device and a second device. The authentication device, the first device and the second device are programmed to carrying out the method according to the present disclosure, for managing rights transfer of using digital content from the first device to the second device.

In a fifth aspect, embodiments of the present disclosure provide a computer program product, which comprises a plurality of program code portions for carrying out the method steps of either the authentication device, the first device, or the second device according to the present disclosure.

According to embodiments of the present disclosure, an anonymous verification solution is proposed for transferring the rights of using digital content from a subscriber to a recipient, which combines the advantages of both delegated certificate verification and anonymous blacklist check. As such, security of rights transfer can be improved, and the privacy of the recipient is well protected from being revealed to the DRM server.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The details of one or more embodiments of the present disclosure are set forth in the accompanying drawings and the description below. Other features, aspects, and advantages of the disclosure will become apparent from the description, the drawings, and the claims, wherein:

Throughout the figures, same or similar reference numbers will always indicate same or similar elements.

DETAILED DESCRIPTION OF EMBODIMENTS

Figure 1:
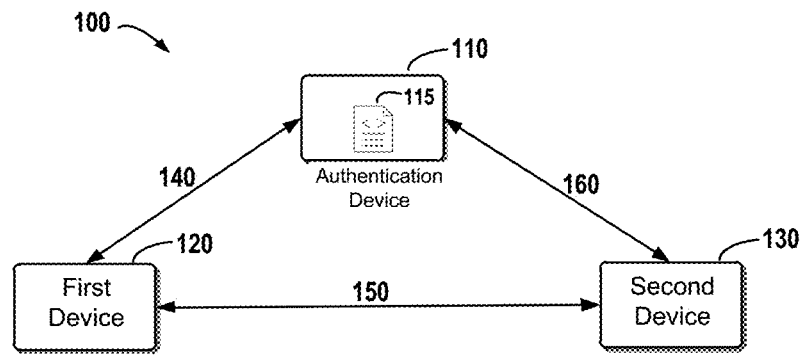
FIG. 1 is a block diagram illustrating a system for digital rights management in which example embodiments of the present disclosure can be implemented.

Principle of the present disclosure will now be described with reference to some example embodiments. It is to be understood that these embodiments are described only for the purpose of illustration and help those skilled in the art understand and implement the present disclosure, without suggesting any limitations as to the scope of the disclosure.

The disclosure described herein can be implemented in various manners other than the ones describe below.

As used herein, the term "include" and its variants are to be read as open terms that mean "include, but is not limited to". The term "based on" is to be read as "based at least in part on". The term "one embodiment" and "an embodiment" are to be read as "at least one embodiment". The term "another embodiment" is to be read as "at least one other embodiment". Moreover, it is to be understood that in the context of the present disclosure, the terms "first," "second" and the like are used to indicate individual elements or components, without suggesting any limitation as to the order of these elements. Further, a first element may or may not be the same as a second element.

As used herein, the term "digital content" is intended to mean any content in a digital format, including but not limited to electronic books, magazines, music, videos, photos, art, movies, ring tones, software, and so forth. The term "authentication device" is to be read as a device that can verify or authenticate the validity of a user device. The authentication device can be implemented as a server (for example, a DRM server), a specific purpose computer, and so on. The term "device" means any electronic device known in the art, which includes, but is not limited to a desktop computer, laptop, cellular phone, smartphone, tablet computer, personal display assistant (PDA), set-top box, TV set or any other device that can handle digital content.

As known, each device belonging to the DRM system may have a pair of keys, namely, a public key and a private key. The private key is kept private and secure, while the public key can be distributed to anyone who requests it, for example, by means of a digital certificate. When one key is used to encrypt data, the other key is required to decrypt the data. Thus, if a public key of a device is used to encrypt data, only this device can decrypt the data using the paired private key, vice versa.

As mentioned in the beginning, digital content is often shared among family members, friends, relatives, co-operators and the like to express feeling or to socialize. In the DRM system, a subscriber may want to transfer his/her rights of using digital content to another subscriber. For example, he or she may want to resell an item of digital content to others, or give the digital content to others as a gift. Due to privacy concerns, the DRM server should preferably not track and record everything of the rights transfer procedure. As described above, in traditional sharing approaches, the owner of digital content may provide a token to the recipient, so that the recipient can obtain a new license. However, the DRM system should still be able to determine that the recipient device is a valid one to avoid undesired use of the digital content, for example, when the recipient device is a malicious or blacklisted device.

A conventional method addresses this problem by verifying a signature of the recipient device. However, in providing the signature, the identity of the second device is revealed to the DRM server. This might not be desired due to the privacy requirements of the owner and/or recipient. To address these and other potential problems, embodiments of the present disclosure provide a method and devices for anonymously verifying the validity of the recipient device in digital content sharing.

Reference is first made to FIG. 1 which shows a block diagram illustrating a system 100 for digital rights management in which exemplar embodiments of the present disclosure can be implemented. The system 100 comprises an authentication device 110, a first device 120 and a second device 130. The authentication device 110 is a device capable of authenticating the validity of a user device. For example, the authentication device 110 may verify the validity of the second device 130 based on the data received from the first device 120 and/or the second device 130, which will be described later. The authentication device 110 may be implemented as a server, a specific purpose computer and so forth. In some embodiments, the authentication device 110 may be a DRM server, for example. In the embodiment illustrated in FIG. 1, the authentication device 110 maintains a blacklist 115, which includes identities of one or more blacklisted devices and/or users that do not have legal licenses to consume digital content governed by the authentication device 110. In some other embodiments, the licenses owned by the blacklisted devices and/or users are already invalid or expired. In some embodiments, the authentication device may maintain a whitelist instead, which lists one or more valid devices each having a corresponding public key.

The first device 120 and/or the second device 130 may be any electronic device. As described above, examples of the first and/or second devices include, but are not limited to, desktop computer, laptop, cellular phone, smartphone, tablet computer, personal display assistant (PDA) and other devices that can play or render digital contents. In some embodiments, the first device 120 and/or the second device 130 may include a digital content reader application. The digital content reader application is configurable to present any suitable digital content to and possibly interact with an end user. For example, the end user may view books, music, audios, videos or any other suitable format of digital contents through the digital content reader application. Only for the purpose of illustration, in the following discussions, the first device 120 serves as the owner or giver of digital content, and the second device 130 serves as the recipient of the digital content. It is to be understood that a DRM server usually governs a lot of user devices, and only two of them are shown in FIG. 1 for illustration.

As shown in FIG. 1, the authentication device 110, the first device 120 and the second device 130 are communicatively connected to one other via the first, second and third links 140, 150 and 160, respectively. Examples of the first, second and third links 140, 150 and 160 include, but are not limited to, a wired or wireless computer connection such as a local area network ("LAN"), a wide area network ("WAN") or the Internet, a communication network, a near-field communication link or any combination thereof.

Figure 2:
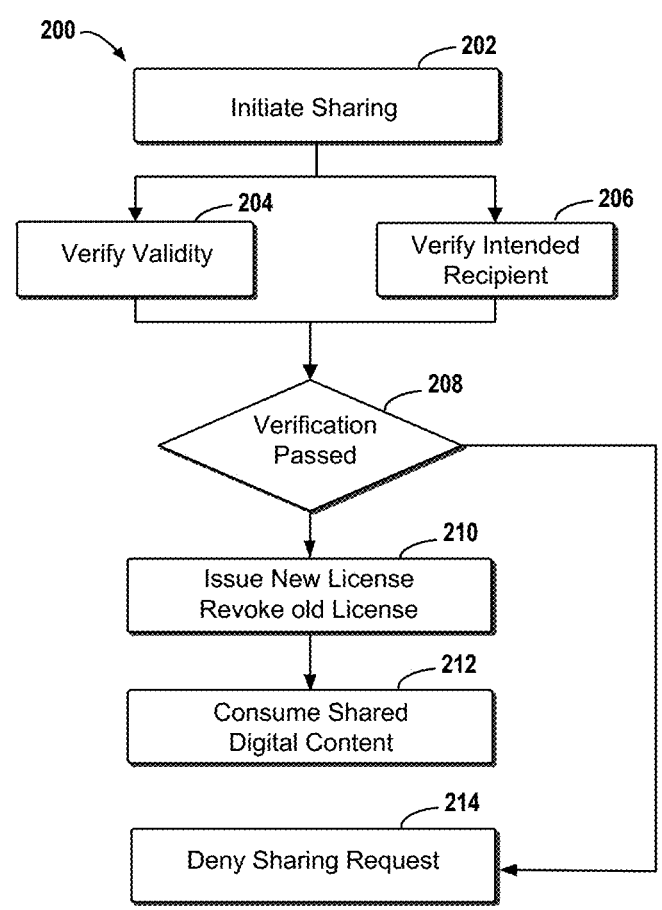
FIG. 2 is a flowchart illustrating a process for sharing digital content in accordance with an example embodiment of the present disclosure.

FIG. 2 is a flowchart illustrating a process 200 for sharing digital content in accordance with an exemplar embodiment of the present disclosure. It is to be understood that the process 200 is only an example without suggesting any limitations as to the scope of the present disclosure. For example, some steps or actions in the process 200 are optional and can be omitted depending on the specific requirements and applications.

As shown in Step 202 in FIG. 2, the first device 120 initiates an action of sharing an item of digital content by sending a sharing request to the authentication device 110. In some embodiments, the first device 120 can send to the authentication device 110 an ID of the digital content to be shared, together with the sharing request. In such a case, the first device 120 is a trusted subscriber device known to the authentication device 110. Subject to DRM requirements, the second device 130 is allowed to use the digital content only if the second device 130 is valid, so the second device 130 should be subject to verification before issuing a new license by the authentication device 110.

In step 204, the authentication device 110 verifies the validity of the second device 130 in an anonymous way. As explained with the aid of FIG. 1, the authentication device 110 may have a blacklist 115, which includes public keys of invalid or blocked devices or users that are so far known to the authentication device 110. So the authentication device 110 is able to determine whether the second device 130 belongs to the invalid devices in the blacklist 115 or not. If the authentication device 110 finds that the second device 130 is already in its blacklist 115, the request for sharing the digital content with the second device 130 will be denied.

In addition, in step 206 of FIG. 2, the authentication device 110 also needs to verify if the second device 130 is indeed an intended recipient that the first device 120 wants to share the digital content with, or just a forger that is trying to pass the verification by cheating. To this end, according to some embodiments of this disclosure, the authentication device 110 provides the first device 120 with specific data as a token, and then the first device 120 encrypts and forwards the specific data to the second device 130 which the first device 120 wants to share digital content with. The second device 130 can decrypt the datasets sent from the first device 120, and give back a response message. The authentication device 110 can receive the response message from the second device 130 via a safe link, for example by virtue of the first device 120, and analyzes whether the response message contains the same token that it has issued. If so, it indicates that the response message does come from an intended recipient that the first device 120 trusts, but not a cheating attempt. It is to be understood that, although the verification 204 is shown in parallel with verification 206 in FIG. 2, this is merely for the purpose of illustration without suggesting any limitation as to the scope of the present disclosure. In some embodiments, the verification step 206 may be carried out before or after the verification step 204.

Then the authentication device 110 determines in step 208 whether both the verification steps 204 and 206 are passed, i.e. whether the second device 130 is a qualified recipient that is not blacklisted. Failure in either verification step 204 or 206 will cause the authentication device 110 to deny the sharing request, as shown in step 214.

Otherwise, if it is determined that both the verification steps 204 and 206 are passed in step 208, the authentication device 110 may issue a new license of using the digital content, and invalidate or revoke the old license of the first device in step 210. For example, the new license can be sent from the authentication device 110 to the first device 120 in response to the sharing request, and the first device 120 will forward the new license to the second device 130, so that the second device 130 can consume this digital content using the newly generated license.

In some embodiments, the initial license may be partially revoked, and a part of the DRM rights may be transferred from the first device 120 to the second device 130. As an example, it is assumed that the initial license has rights to play the digital content twice. The first device 120 may share the digital content by providing the second device 130 with the right to play the digital content one time. This can be realized by changing the counter or counting fields at the first and second devices 120 and 130. At this point, the initial license assigned to the first device 120 is just partially revoked.

After obtaining the newly granted license for the digital content, the second device 130 may obtain the digital content from the authentication device 110 directly or through the first device 120. Then in step 212, the second device 130 may consume the shared digital content, such as presenting a book, playing a movie and so on.

In this way, the authentication device 110 does not know the identity of the second device 130 with which the digital content is shared. Thus, since the authentication device 110 anonymously verifies the validity of the second device 130, the level of privacy is improved.

It can be seen that, in the process 200, the digital content can be shared with the second device 130 only when both the verification steps 204 and 206 are passed. An exemplar embodiment of implementing the verification steps 204 and 206 will be described in detail with reference to FIG. 3.

Moreover, according to some embodiments of the present disclosure, the validity of the second device 120 can be additionally verified by the first device 120 through a device certificate. For example, the second device may send its device certificate to the first device 120. The first device 120 may verify the device certificate of the second device 130, and thus generate an indication V, indicating whether the second device 130 is a valid device or not. The indication V is provided from the first device 120 to the authentication device 110. The authentication device 110 will carry out further verification steps 204 and 206 only if the indication V suggests that the second device 130 is a valid device. Otherwise, if the indication V shows that the second device 130 is not valid, the process 200 will come to an end, and the sharing request will be denied by the authentication device 110 directly. Such that the security of content sharing in a DRM system is further improved in a more efficient way.

Figure 3:
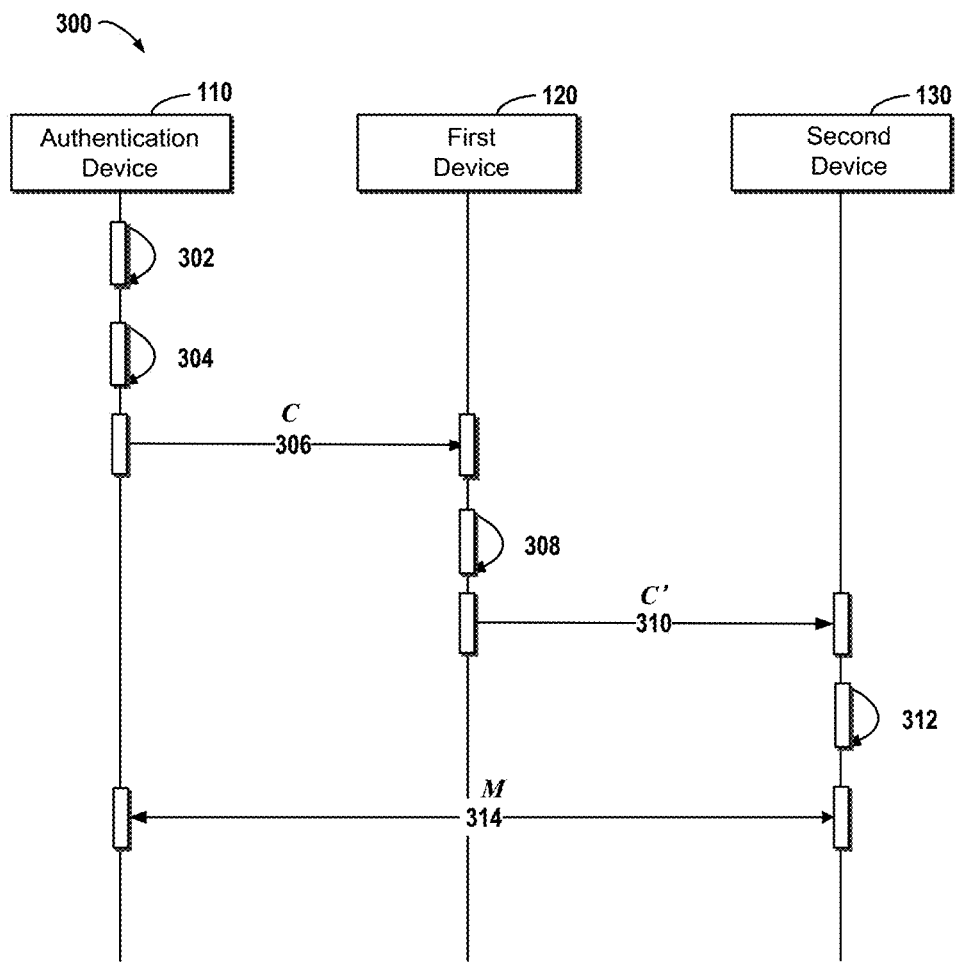
FIG. 3 is a schematic diagram illustrating an action of verifying validity of the recipient device in accordance with an example embodiment of the present disclosure.

FIG. 3 is a schematic diagram illustrating verification steps 204 and 206 of FIG. 2 in accordance with an exemplary embodiment of the present disclosure. As shown in FIG. 3, upon receiving a sharing request from the first device 120, the authentication device 110 generates a first verification code $R_1$ and a second verification code $R_2$ in step 302. In the illustrated example, the first verification code $R_1$ and the second verification code $R_2$ are both random numbers. Any other verification codes (such as random letters or a combination of random numbers and letters) are possible as well. In some alternative embodiments, the first verification code $R_1$ and/or the second verification code $R_2$ may be generated at a user device, for example at the second device 120, and then be sent to the authentication device 110.

According to embodiments of the present disclosure, the authentication device 110 maintains a blacklist 115, which includes public key(s) that are not in use as valid public keys, for examples the public keys of invalid devices, or their users that are not allowed to consume content governed by the authentication device 110, or such public keys are already invalid or expired. The blacklist 115 can be generated in a variety of ways. For example, the devices which have been proved to be malicious devices can be put into the blacklist 115. In this disclosure a device listed in the blacklist 115 is sometimes referred to as a "blacklisted device".

Then in step 304, the authentication device 110 encrypts the first verification code $R_1$ with one or more public keys listed in the blacklist, so as to obtain one or more encrypted versions of the first verification code $R_1$. Thus a first authentication dataset C is generated from the encrypted versions of the first verification code $R_1$, and the authentication device 110 sends the first authentication dataset C to the first device 120. The first authentication dataset C can be expressed as below:

$$C=(C_1, C_2, \ldots, C_n)=(E_{kp1}(R_1), E_{kp2}(R_1), \ldots, E_{kpn}(R_1)) \quad (1)$$

Where n represents the number of items within the blacklist, $C_1, C_2, \ldots, C_n$ represent n elements in the first authentication dataset C, kpn represents the public key of the $n^{th}$ item in the blacklist, and $E_{kpn}(R_1)$ represents an encrypted verification code by encrypting $R_1$ using the public key kpn of the $n^{th}$ item in the blacklist.

In some embodiments, the authentication device 110 requires that the size of the first verification code $R_1$ is large enough. As will be discussed later, a large random number may further reduce the risk that a malicious device passes the verification. To this end, if the number of the blacklisted devices is below a threshold number, in an embodiment, the authentication device 110 may generate the first authentication dataset C by encrypting the first verification code $R_1$ with the public keys kp1, kp2, . . . , kpn of the blacklisted devices and at least one additional public key that is neither valid nor blacklisted. Alternatively, or in addition, the authentication device 110 may generate the first authentication dataset C by encrypting one or more additional random numbers using the public key of each blacklisted device.

Then in step 306 the authentication device 110 sends the first authentication dataset C to the first device 120 via a safe link. In some embodiments, if the second verification code $R_2$ is generated by the authentication device 110, the authentication device 110 also sends the second verification code $R_2$ to the first device 120 in step 306.

In response, the first device 120 encrypts the second verification code $R_2$ with a public key of the second device 130, and combines such encrypted version of the second verification code $R_2$ and one or more elements in the first authentication dataset C, such as to generate a second authentication dataset C' (step 308). Since the second device 130 is supposed to be an intended recipient that the user of the first device 120 wants to share the digital content with, the first device 120 shall know the public key of the second device 130. Therefore, the first device 120 is able to encrypt the second verification code $R_2$ using the public key of the second device 130. It is to be understood that the second authentication dataset C' includes both the elements $C_1, C_2, \ldots, C_n$ in the received first authentication dataset C and the encrypted version of the second verification code $R_2$, while the first authentication dataset C is generated at the authentication device 110 by encrypting the first verification code $R_1$ using the public keys that are not in use as valid public keys. The second authentication dataset C' can be expressed as below:

$$C'=(C_1,C_2,\ldots,C_k,E_{kpr}(R_2),C_{(k+1)},\ldots C_n) \quad (2)$$

where $C_1, C_2, \ldots, C_k, C_{k+1}, \ldots C_n$ represent n elements in the first authentication dataset C, kpr represents the public key of the second device 130, and $E_{kpr}(R_2)$ represents an encrypted verification code obtained by encrypting the second verification code $R_2$ using the public key kpr of the second device 130.

In some embodiments, the first device 120 may insert the encrypted verification code $E_{kpr}(R_2)$ into the second authentication dataset C' at a random position. For example, the position of the encrypted verification code $E_{kpr}(R_2)$ is randomly determined in such a way that the second device 130 cannot identify easily the encrypted verification code $E_{kpr}(R_2)$ in the second authentication dataset C'.

Thus generated second authentication dataset C' is sent (step 310) from the first device 120 to the second device 130 via a safe link. Upon receipt of the second authentication dataset C', the second device 130 decrypts each element in the second authentication dataset C' using a private key of the second device 130, such as to obtain a response message M (step 312). Thus the response message M may be expressed as below:

$$M=(D_{ksr}(B_1),D_{ksr}(B_2),\ldots,D_{ksr}(B_n),D_{ksr}(B_{n+1})) \quad (3)$$

where $B_1, B_2, \ldots, B_n, B_{n+1}$ represent n+1 items in the second authentication dataset C', ksr is the private key of the second device 130, and $D_{ksr}(B_n)$ represents a decrypted element obtained by decrypting the $n^{th}$ element $B_n$ in the second authentication dataset C' using the private key ksr of the second device 130. If the second device 120 is the intended recipient, its public key is supposed to be known to the first device 120, so the decrypted elements in the response message M shall include the second verification code $R_2$. Meanwhile, if the second device 130 is not blacklisted by the authentication device 110, the second device 130 will not be able to decrypt the elements in the second authentication dataset C' which have been encrypted using the public keys of blacklisted user devices, so the decrypted elements in the response message M shall not include the first verification code $R_1$.

In the embodiment shown in FIG. 3, the response message M is sent from the second device 130 to the authentication device 110 through a safe link in step 314. Alternatively, in another embodiment, the second device 120 can first send the response message M to the first device 120, and then the first device 120 forwards the response message M to the authentication device 110. In such a way, the direct communication between the second device 120 and the authentication device 110 can be spared, and the anonymity of the second device 120 is further protected.

In some embodiments, in order to further prevent the authentication device 110 from using brute-force search to find out the identity of the second device 130, the response message M can be subject to a certain one-way function, for example a hash function, at the second device 130, before being sent out to the authentication device 110. In such a case, the Equation (3) may be converted as below.

$$M=(H(D_{ksr}(B_1)),H(D_{ksr}(B_2)),\ldots,H(D_{ksr}(B_n)),H(D_{ksr}(B_{n+1}))) \quad (4)$$

Where H( ) denotes a one-way function, for example a hash algorithms such as MD5 or SHA-1. When receiving such a modified (or "hashed") response message M, the authentication device 110 cannot decrypt the hashed elements in the response message M and compare them directly with the first verification code $R_1$ and the second verification $R_2$, but has to apply the same one-way function H( ) to the first verification code $R_1$ and the second verification $R_2$ and compare the hashed elements in the response message M with the hashed first verification code $H(R_1)$ and the hashed second verification $H(R_2)$. In such a way, the identity of the second device 130 is by no means known to the authentication device 110, even when the authentication device 110 tries to decrypt the received response with brute-force by using all the public keys of the user devices it knows.

In some embodiments, a secret verification code x, for example a random number, is selected or generated at the second device 130, which will be used as an encrypting key of a new license. The second device 130 encrypts the secret verification code x using the public key kps of the authentication device 110 to obtain an encrypted key $E_{kps}(x)$, and sends the encrypted key to the authentication device 110. In an exemplar embodiment, the second device 130 may send the encrypted key $E_{kps}(x)$, together with the response message M, to the first device 120, and the first device 120 in turn forwards these data to the authentication device 110.

In some embodiments, the second device 130 may combine an ID of the digital content involved in the rights transfer, the response message M and the encrypted key $E_{kps}(x)$ into a combined response message, and sends the combined response message to the authentication device 110 directly or via the first device 120.

In some embodiments, the second device 130 may also send its device certificate to the first device 120. Then the first device 120 can verify the device certificate of the second device 130 and generate an indication V for signaling whether the device certificate is valid or not. Then the first device 120 sends the response message and the indication V to the authentication device 110 for further verification. When receiving the indication V sent from the first device 110 (for example together with the response message M), the authentication device 110 may check the indication V first. If the indication V shows that the device certificate of the second device 130 is valid, the authentication device 110 will continue to verify the response message M. Otherwise, if the indication V shows that the device certificate of the second device 130 is invalid or expired, the authentication device 110 will deny the sharing request without doing further verification.

The verification procedure at the authentication device 110 will be further described with reference to FIG. 4, which shows a schematic diagram of a decision tree for use in the verification. In step 410, the authentication device 110 will check whether the received response message M contains any data value corresponding to the first verification code $R_1$.

As described above with reference to FIG. 3, the first data $R_1$ has been encrypted using the public keys of blacklisted devices known to the authentication device 110 in step 304, respectively, and the second device 130 has decrypted the encrypted versions of the first verification code $R_1$ using its own private key ksr in step 312. If the second device 130 itself is an invalid device blacklisted by the authentication device 110, its public key, which was used to encrypt the first verification code $R_1$ at the authentication device 110, would be paired to the private key of the second device 130 which was used for decrypting the second authentication dataset C', and, as a result, the response message M would contain a value corresponding to the first verification code $R_1$. Therefore, when the authentication device 110 finds out that the received response message M includes an element corresponding to the first verification code $R_1$ (Branch 420), the authentication device 110 can determine the second device 130 as a blacklisted device (Node 450). In return, the authentication device 110 will refuse the rights transfer to the second device 130.

To the contrary, if the second device 130 is not a blacklisted device, the keys used for encrypting and decrypting the first verification code $R_1$ must be unmatched to one another. As a result, the response message M will with a very high likelihood not contain the first verification code $R_1$ because the second device 130 was not able to correctly decrypt the encrypted versions of the first verification code $R_1$ from the second authentication dataset C'. Thus the authentication device 110 can determine that the second device 130 is not among the blacklisted devices that it knows.

Figure 4:
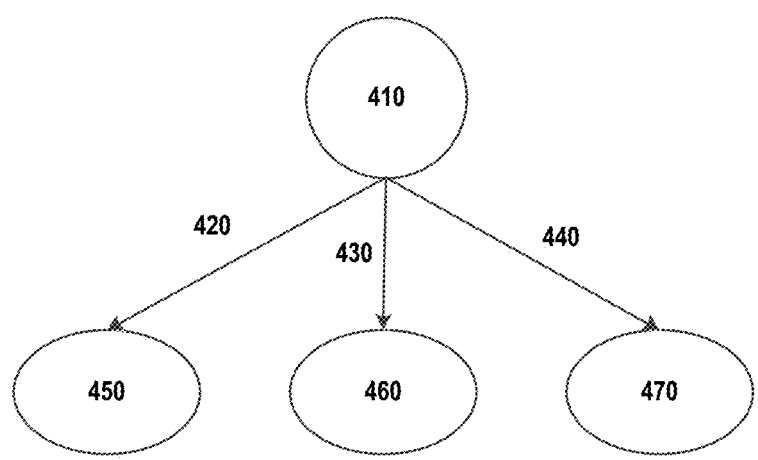
FIG. 4 is schematic diagram of a decision tree used in verifying validity of the recipient device in accordance with an example embodiment of the present disclosure.

Also in step 410 of FIG. 4, the authentication device 110 will check whether the received response message M includes a data value corresponding to the second verification code $R_2$. If the second verification code $R_2$ is included in the response message M (Branch 430), it means that the second device 130 has successfully decrypted the second authentication dataset C' using its private key. Since the second verification code $R_2$ was only known to the authentication device 110 and the first device 120, successful decryption of the encrypted version of the second verification code $R_2$ in the second authentication dataset C' suggests that the second device 130 is indeed the intended recipient to whom the first device 120 has forwarded the second authentication dataset C'. Otherwise, if the received response message M does not include any data value corresponding to the second verification code $R_2$, it may imply that the received response message M comes from a forger but not the intended recipient.

The aforementioned verifications about the first and second verification codes $R_1$ and $R_2$ can be implemented in any sequence or in parallel at the authentication device 110. If the authentication device 110 determines in step 410 that the received response message M contains a data value corresponding to the second verification code $R_2$ but does not contain any data value corresponding to the first verification code $R_1$, it indicates that the verifications have been passed (i.e. the second device 130 is a valid DRM device to receive the rights transfer, the procedure goes to Branch 430), and the authentication device 110 will allow the sharing request (Node 460).

If it turns out that the received response message M does not include either the first verification code $R_1$ or the second verification code $R_2$ (Branch 440), it indicates that, even though the second device 130 is not among the blacklisted devices know to the authentication device 110, the second device 130 is suspected to be cheating, because it failed to decrypt the second verification code $R_2$ in the second authentication dataset C' using its private key. The authentication device 110 will then determine the second device 130 as a fraudulent device and refuse the rights transfer (Node 470).

After such verifications, the authentication device 110 may give a reply to the first device 120 and inform it whether the sharing request is allowed or not.

In some embodiments, said first and second verification codes $R_1$ and $R_2$ are both random numbers. In other embodiments, at least one of the first and second verification codes $R_1$ and $R_2$ may include a plurality of random numbers, instead of a single one. If the first verification code $R_1$ includes a plurality of random numbers, each of the public keys of the blacklisted devices can be used to encrypt at least one random number in the first verification code $R_1$ to generate the first authentication dataset C. Likewise, if the second verification code $R_2$ includes a plurality of random numbers, the public key of the second device 130 may be used to encrypt all the random numbers in the second verification code $R_2$ to generate the second authentication dataset C' in order to increase the security of the DRM protected digital content.

To avoid accidental matches (collisions) when decrypting with a wrong key, the length of the first verification code $R_1$ and/or second verification code $R_2$ can be set long enough. Still considering random numbers as an example, the length of at least one of the first and second verification codes $R_1$ and $R_2$ may exceed a predetermined length, for example, 128 bits.

In some embodiments as mentioned above, when the second device 130 has imposed a one-way function H( ), for example a hash function like MD5 or SHA-1 to the response message M to achieve higher privacy protection, the authentication device 110 will also apply the same one-way function H( ) to the first and second verification code $R_1$ and $R_2$ to obtain the modified (hashed) first and second verification codes, respectively, i.e. $H(R_1)$ and $H(R_2)$, wherein $H(\ )$ denotes the same one-way function used by the second device 130. Once the authentication device 110 receives from the second device 130 a hashed response message M, the authentication device 110 will verify in step 410 whether the received hashed response message M contains a data value corresponding to the modified second verification code $H(R_2)$ but does not contain any data value corresponding to the modified first verification code $H(R_1)$. And the rights transfer is only to be allowed when such verification has passed.

Otherwise, if it turns out that the hashed response message M contains a data value corresponding to the modified first verification code $H(R_1)$, the authentication device 110 can determine that the second device 130 is a blacklisted device; or if the hashed response message M does not contains a data value corresponding to the modified second verification code $H(R_2)$, it indicates that the second device 130 is likely a fraudulent device trying to cheat. The authentication device 110 will refuse the rights transfer accordingly.

In some embodiments as mentioned above, when the received response message includes an encrypted key $E_{kps}(x)$, wherein x is a secret key, for example a random number, generated by the second device 130 and was encrypted with the public key of the authentication device 110, the authentication device 110 may, after success of the verifications in step 410, decrypt $E_{kps}(x)$ to obtain the secret key x, and generate a new license, for example based on the ID of the old licensed used by the first device 120, while using x as the encrypting key in the new license. The newly generated license can be sent to the first device 120 in a message, and the old license can be revoked or invalidated. The second device 130 can use this new license to consume the shared digital content.

In some embodiments, actions 302-314 in process 300 may be performed a plurality of times to enhance the security. If the validity of the second device 130 is not verified successfully in any one of verifications, then the second device 130 will be recognized as an invalid device.

In some embodiments as mentioned above, when the received response message includes an indication V, which was generated by the first device 120 after verification of a device certificate of the device 130, the authentication 110 may first check the indication V before doing the verifications in step 410. If the indication V suggests that the device certificate of the second device 130 is invalid, the authentication 110 can directly reject the sharing request without doing further verifications. Otherwise, if the indication V shows that the device certificate of the second device 130 is valid, the authentication 110 can continue to do the verifications in step 410, as explained above.

Figure 5:
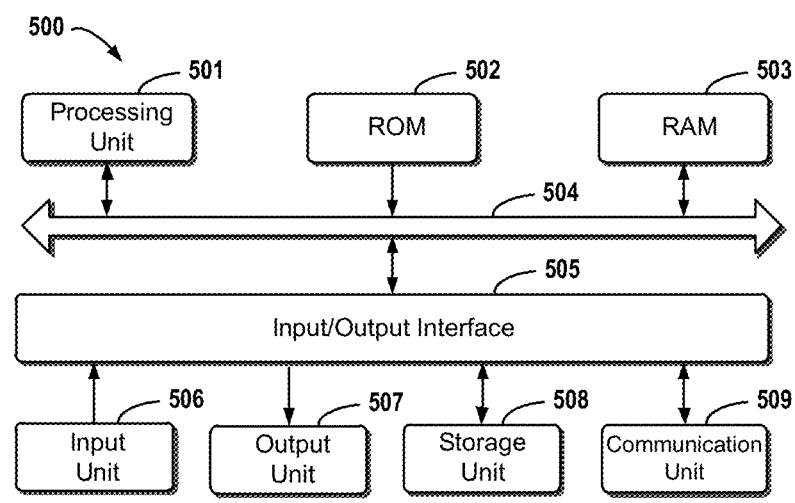
FIG. 5 is a block diagram of a device suitable for implementing embodiments of the present disclosure.

FIG. 5 is a block diagram of a device 500 suitable for implementing embodiments of the present disclosure. For example, the device 500 may function as the authentication device 110, the first device 120 and/or the second device 130 as discussed above with reference to FIG. 1. As shown, the device 500 comprises a processing unit 501 (such as, a central processing unit, CPU) which is capable of performing various processes in accordance with a program stored in a read only memory (ROM) 502 or a program loaded from a storage unit 508 to a random access memory (RAM) 503. In the RAM 503, data required when the CPU 501 performs the various processes or the like is also stored as required. The CPU 501, the ROM 502 and the RAM 503 are connected to one another via a bus 504. An input/output (I/O) interface 505 is also connected to the bus 504.

The following components are connected to the I/O interface 505: an input unit 506 including a keyboard, a mouse or the like; an output unit 507 including a display such as a cathode ray tube (CRT), a liquid crystal display (LCD) or the like, and a loudspeaker or the like; the storage unit 508 including a hard disk or the like; and a communication unit 509 including a network interface card such as a LAN card, a modem or the like. The communication unit 509 performs a communication process via the network such as the Internet.

Specifically, in accordance with embodiments of the present disclosure, the processes or methods 200 and 300 described above with reference to FIGS. 2 and 3 may be implemented as computer programs. For example, embodiments of the present disclosure comprise a computer program product including a computer program tangibly embodied on a machine readable medium, the computer program including program verification code for performing the processes or methods 200 and 300. In such embodiments, the computer program may be downloaded and mounted from the network via the communication unit 509.

For the purpose of illustrating spirit and principle of the present disclosure, some specific embodiments thereof have been described above. In general, the various example embodiments may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

In the context of the present disclosure, a machine readable medium may be any tangible medium that can contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program verification code for carrying out methods of the present disclosure may be written in any combination of one or more programming languages. These computer program verification codes may be provided to a processor of a general purpose computer, special purpose computer, or other programmable data processing apparatus, such that the program verification codes, when executed by the processor of the computer or other programmable data processing apparatus, cause the functions or operations specified in the flowcharts and/or block diagrams to be implemented. The program verification code may execute entirely on a computer, partly on the computer, as a stand-alone software package, partly on the computer and partly on a remote computer or entirely on the remote computer or server.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable subcombination.

Various modifications, adaptations to the foregoing example embodiments of this disclosure may become apparent to those skilled in the relevant arts in view of the foregoing description, when read in conjunction with the accompanying drawings. Any and all modifications will still fall within the scope of the non-limiting and example embodiments of this disclosure. Furthermore, other embodiments of the disclosures set forth herein will come to mind to one skilled in the art to which these embodiments of the disclosure pertain having the benefit of the teachings presented in the foregoing descriptions and the drawings.

Therefore, it will be appreciated that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method for managing rights transfer of using digital content from a first device to a second device, comprising:
    providing a first verification code $R_1$ and a second verification code $R_2$;
    encrypting the first verification code $R_1$ with one or more improper public keys at an authentication device,
    wherein the encrypted first verification codes $R_1$ are a first authentication dataset C,
    wherein the first authentication dataset C comprises first elements,
    wherein the one or more improper public keys are not valid public keys;
    encrypting the second verification code $R_2$ with a public key of the second device at the first device;
    combining the encrypted version of the second verification code $R_2$ and the first elements,
    wherein the combination of the second verification code $R_2$ and the first elements is a second authentication dataset C',
    wherein the second authentication dataset C' comprises second elements;
    decrypting the second elements to obtain decrypted second elements using a private key at the second device;
    obtaining a response message M using the decrypted second elements; and
    verifying the response message M to allow the rights transfer only when the response message M contains a data value corresponding to the second verification code $R_2$ but does not contain any data value corresponding to the first verification code $R_1$ at the authentication device;
    sending a device certificate from the second device to the first device, wherein the device certificate identifies the second device;
    verifying that the device certificate is valid at the first device;
    providing an indication V from the first device to the authentication device.

2. The method according to claim 1, wherein the response message M is sent from the second device to the first device and then forwarded from the first device to the authentication device.

3. The method according to claim 1, further comprising:
    verifying the response message M when the indication V indicates that the device certificate of the second device is valid at the authentication device; and
    denying the rights transfer if the indication V indicates that the device certificate of the second device is not valid at the authentication device.

4. The method according to claim 1, further comprising:
    sending from the second device to the first device an ID of the digital content involved in the rights transfer; and
    forwarding the ID of the digital content from the first device to the authentication device.

5. The method according to claim 1, further comprising generating a new license including a secret key x at the authentication device.

6. The method according to claim 5, wherein the secret key x is obtained by the authentication device by:
    selecting or generating a secret key x at the second device;
    encrypting the secret key x with a public key of the authentication device so as to generate an encrypted version of the secret key x;
    sending the encrypted version of the secret key x from the second device to the first device;
    forwarding the encrypted version of the secret key x from the first device to the authentication device; and
    decrypting the encrypted version of the secret key x with the public key of the authentication device so as to obtain the secret key x at the authentication device.

7. The method according to claim 1,
    wherein the obtaining the response message M at the second device further comprises imposing a one-way function H( ) on the decrypted second elements,
    wherein the verifying at the authentication device comprises imposing the same one-way function H( ) on the first verification code $R_1$ and the second verification code $R_2$ to obtain a modified first verification code $H(R_1)$ and a modified second verification code $H(R_2)$, respectively,
    wherein the rights transfer is allowed only when the response message M contains a data value corresponding to the modified second verification code $H(R_2)$ but does not contain any data value corresponding to the modified first verification code $H(R_1)$.

8. The method according to claim 7, wherein the one-way function H( ) is a hash function.

9. The method according to claim 1,
    wherein at least one of the first verification code $R_1$ and the second verification code $R_2$ includes a random number, wherein a length of at least one of the first verification code $R_1$ and the second verification code $R_2$ exceeds a predetermined length.

10. The method according to claim 1, wherein the method is initiated by a sharing request from the first device to the authentication device.

11. An authentication device for managing rights transfer of using digital content from a first device to a second device, comprising:
a processing circuit; and
a memory circuit coupled to the processing circuit,
wherein the memory circuit stores instructions,
wherein the instructions,
wherein the instructions when executed by the processing circuit cause the authentication device to:
generate a first authentication dataset C,
wherein the first authentication dataset C comprises first elements,
wherein the first elements comprise encrypted verification codes,
wherein the encrypted verification codes are generated by encrypting a first verification code $R_1$ with one or more improper public keys,
wherein the improper public keys are not valid public keys;
send the first authentication dataset C from the authentication device to the first device;
receive a response message M from the second device,
wherein the response message M is generated by decrypting a second authentication dataset C' with a private key of the second device,
wherein the second authentication dataset C' is generated by combining the first elements and an encrypted version of a second verification code $R_2$ encrypted with a public key of the second device;
compare the response message M with the first elements and the second verification code $R_2$; and
allow the rights transfer only when the response message M contains a data value corresponding to the second verification code $R_2$ but does not contain any data value corresponding to the first verification code $R_1$;
receive an indication V from the first device.

12. A first device capable of transferring rights of using digital content to a second device under management of an authentication device comprising:
a processing circuit; and
a memory circuit coupled to the processing circuit,
wherein the memory circuit stores instructions,
wherein the instructions, when executed by the processing circuit cause the first device to:
receive a first authentication dataset C,
wherein the first authentication dataset C comprises first elements,
wherein the first elements comprise encrypted versions of a first verification code $R_1$,
wherein the first verification code is received from the authentication device,
wherein the encrypted versions of the first verification code $R_1$ is generated by encrypting the first verification code $R_1$ with one or more improper public keys,
wherein the improper public keys are not valid public keys;
encrypt a second verification code $R_2$ with a public key of the second device,
combine the encrypted version of the second verification code $R_2$ and the first elements to generate a second authentication dataset C';
send the second authentication dataset C' to the second device; and
receive a new license of using the digital content from the authentication device after the rights transfer is allowed by the authentication device;
receive a device certificate from the second device, wherein the device certificate identifies the second device;
verify that the device certificate is valid.

13. A non-transitory medium storing a computer program, wherein the computer program when executed on a processor performs the method comprising:
providing a first verification code $R_1$ and a second verification code $R_2$;
encrypting the first verification code $R_1$ with one or more improper public keys at an authentication device,
wherein the encrypted first verification codes $R_1$ are authentication dataset C,
wherein the first authentication dataset C comprises first elements,
wherein the one or more improper public keys are not valid public keys;
encrypting the second verification code $R_2$ with a public key of a second device at a first device;
combining the encrypted version of the second verification code $R_2$ and the first elements,
wherein the combination of the second verification code $R_2$ and the first elements is a second authentication dataset C',
wherein the second authentication dataset C' comprises second elements;
decrypting the second elements to obtain decrypted second elements using a private key at the second device;
obtaining a response message M using the decrypted second elements;
verifying the response message M to allow the rights transfer only when the response message M contains a data value corresponding to the second verification code $R_2$ but does not contain any data value corresponding to the first verification code $R_1$ at the authentication device;
sending a device certificate from the second device to the first device, wherein the device certificate identifies the second device;
verifying that the device certificate is valid at the first device;
providing an indication V from the first device to the authentication device.

* * * * *